United States Patent [19]
Kramling et al.

[11] Patent Number: 5,484,657
[45] Date of Patent: Jan. 16, 1996

[54] GLAZING PANE AND METHOD FOR ITS PRODUCTION

[75] Inventors: Franz Kramling, Aachen, Germany; Herve Charrue, Rueil Malmaison, France; Frederic Weber, Compiegne, France; Bernard Letemps; Claude Didelot, both of Thourotte, France

[73] Assignee: Saint-Gobain Vitrage International, Courbevoie, France

[21] Appl. No.: 341,928

[22] Filed: Nov. 16, 1994

Related U.S. Application Data

[62] Division of Ser. No. 920,285, Nov. 9, 1992, Pat. No. 5,397,647.

[30] Foreign Application Priority Data

Jun. 11, 1991 [FR] France .................................. 91 07091

[51] Int. Cl.$^6$ ...................................................... B32B 9/00
[52] U.S. Cl. ............................ 428/426; 428/34; 428/38; 428/192; 428/212; 428/215; 428/128; 428/410; 428/425.6; 428/432; 296/96.14; 296/97.7; 296/84.1; 219/203; 219/547; 65/104; 65/106; 65/114; 65/115

[58] Field of Search ................................ 428/426, 34, 38, 428/192, 212, 410, 432, 215, 425.6; 296/84.1, 97.7, 96.14; 65/114, 115; 219/203, 547

[56] References Cited

U.S. PATENT DOCUMENTS

| | | | |
|---|---|---|---|
| 2,247,118 | 6/1941 | Drake | 65/114 |
| 3,776,709 | 12/1973 | Melling et al. | 65/114 |
| 4,075,381 | 2/1978 | Furukawa et al. | 428/192 |
| 4,124,733 | 11/1978 | Melling et al. | 428/112 |
| 4,913,720 | 4/1990 | Gardon et al. | 65/114 |
| 5,397,647 | 3/1995 | Kramling et al. | 428/426 |

*Primary Examiner*—Patrick J. Ryan
*Assistant Examiner*—Abraham Bahta
*Attorney, Agent, or Firm*—Oblon, Spivak, McClelland, Maier & Neustadt

[57] ABSTRACT

A method for the preparation of glass sheets with a view to laminating them consists of curving the glass sheets by causing them to pass one after another along a curved trajectory, then cooling them by passage between blowing chests, and of dispatching them by batches to the assembling station, and a laminated pane, the sheets of which have, in the central zone, a core compressive stress of from 1 to 50 MPa.

7 Claims, 3 Drawing Sheets

GLAZING PANE AND METHOD FOR ITS PRODUCTION

This application is a Divisional of application Ser. No. 07/920,285, filed Nov. 9, 1992, patented as U.S. Pat. No. 5,397,647, which was filed as International Application No PCT/FR92/00518 on Jun. 10 1992.

BACKGROUND OF THE INVENTION

This invention relates to a glazing pane, more especially intended for automobile vehicles, and notably for equipping the side regions with sliding panes. More specifically, the invention concerns a safety glass pane of the type known as laminated, of which the glass sheet or sheets have undergone a thermal treatment and are assembled to one another by a sheet of plastics material. The invention also has as its subject a method for the production of such a pane.

For improving the mechanical strength of a glass sheet, it is well known that it is advantageous to carry out a treatment known as thermal toughening enabling the surface of the glass to be brought into compression, the compressive strength of glass being much higher than its tensile strength.

Thermal toughening consists of cooling the surface of a glass sheet in such a way as to solidify it at the surface before the interior becomes fixed, with the result that, when cooling continues throughout the thickness, the interior cannot contract normally, since it is prevented by the solidification of the surface. The interior is then subject to tensile stresses, whereas at the surface compressive stresses form.

When the state of the stresses induced in a glass sheet by such a thermal treatment is considered, three principal regions should be distinguished. The first region is the central region, little influenced by the edge and where, to a first approximation, it may be assumed that the glass sheet behaves as a glass sheet of infinite dimensions. If this glass sheet is of constant thickness and is cooled uniformly on both its faces, the stresses are distributed through the thickness of the sheet in accordance with a parabolic distribution, characterized by a surface compressive stress and a tensile stress in the median plane of the sheet, also termed core tensile stress. This distribution, known as the thickness stress distribution, is isotropic, the integral of the stresses along the thickness being zero, as also is the integral of the moments.

In theory, the value of the surface compressive stress is exactly equal to twice the value of the core tensile stress, although in practice a higher value should be adopted.

Moreover, a glass sheet certainly has finite dimensions and at its arrises the cooling also affects the edge face and locally concerns the entire thickness of the glass sheet. In the region bordering on the edges thus affected, the integral of the stresses through the thickness is no longer zero but leads to a preponderance of compressive stresses. In this region, the thickness stresses are therefore anisotropic. The stress tangential to the surface, averaged over the entire thickness of the glass sheet, is termed the edge stress. This marginal region has a quite special importance, notably during installation and in the case of panes mounted with a free edge, such as for example the sliding lateral panes of an automobile vehicle. The width of this marginal region is generally of the order of 2 to 3 times the thickness of the glass sheet.

However, these edge stresses are balanced locally by tensile stresses. At the frontier between the marginal region of the edge stresses and the central region, there thus exists an intermediate region where the integral of the difference of the stresses is not zero and leads to a preponderance of tensile stresses. This intermediate region, therefore having anisotropic stresses, can reach a width of several centimeters and is a very brittle region because the glass there is locally prestressed in tension. The higher the edge stresses, the higher these tensile stresses will be.

It is important to emphasize that the foregoing analysis is true even in the case of non-toughened glass sheets which, in contrast, are annealed as are, in particular, the glass sheets more especially intended for the manufacture of laminated panes. In accordance with the technique most commonly used today these sheets of glass, after they have been cut to the desired shape, are superimposed in pairs on a curving mold, such as an annular frame open at its center, and are reheated on this mold in a furnace for curving by gravity. When the desired shape has been obtained, the assembly is moved into an annealing station for a slow cooling of the glass, thus enabling the internal stresses induced during the curving to be relaxed. But this annealing does not prevent a more pronounced cooling of the edges, which are cooled on three surfaces and, for this reason, edge stresses are certainly observed in the marginal region, compensated by tensile stresses in a frontier region.

In any case, an attempt is always made to incorporate edge stresses, in order to increase the mechanical strength of the edges. This is why treatments may even be carried out of the light cooling blowing type on the edges, so as to increase the edge stresses even although the compressive stress at the surface does not generally exceed 5-10 MPa for the central region. In this case, however, the level of the tensile stress in the frontier zone is thus increased, and for this reason this zone becomes still more fragile.

For glazing panes such as windscreens, the problem posed by this frontier zone and/or the low level of the edge stresses may be eliminated by the use of mounting frames glued or molded around the pane, which serve as protection. But for a pane mounted flush or with a free edge, no protection is possible and the pane has a small, particularly fragile region, which is notably sensitive to flying stone chippings.

On the other hand, it has been indicated above that thermal toughening enables a higher mechanical strength to be conferred upon a pane. If, however, the pane is successfully broken, it shatters into a multitude of fragments, through which visibility is virtually zero. In contrast, in the case of a laminated body of annealed glass, the gravel impact causes the formation of a star with a small number of splinters around the point of impact and a visibility through the pane which is very largely preserved. It must be understood, however, that this is achieved at the expense of a much lower resistance to damage from gravel than in the case of a toughened pane. Therefore, although breakages are less annoying, they are also much more frequent.

In these circumstances it has been proposed to create laminated automobile glazing panes of toughened glass, but with the major disadvantage of a pane that is entirely unusable if impact succeeds in breaking it. Furthermore, such panes are very difficult to produce in that, in order to avoid excessive weight, the laminated panes for automobiles are generally composed of thin glass sheets which, by reason of their thinness, present some problems of reproducibility of the curvature, but in particular which are virtually impossible to toughen to toughening values, and therefore notably to surface compressive stress values, of a level equivalent to that adopted for the toughening of conventional monolithic glasses, such as the lateral window panes or rear windows. In any case, this solution in no way resolves the problem of the zone subjected to tension by the edge stresses.

SUMMARY OF THE INVENTION

The present invention has the objective of a pane having a marginal region with relatively high edge stresses but with nevertheless a frontier region in tension causing the least possible harm, of a reduced width and/or with low tensile stress levels. Another objective of the inventors was the creation of glass sheets which have undergone a hardening thermal treatment and which can have relatively small thicknesses and of an optical quality and accuracy of curvature sufficiently high to allow them to be assembled in pairs, if desired, in a laminated glazing pane.

According to the present invention, this objective is achieved by a pane composed of at least one glass sheet of a thickness of from 1.5 to 4 mm, having undergone a hardening thermal treatment, which has a central region in which the surface compressive stress is from 40 to 100 MPa, preferably from 50 to 70 MPa and preferably again from 60 to 65 MPa, a marginal region having an edge stress of from 50 to 100 MPa and an intermediate region, disposed between the central region and the marginal region, having an anisotropic thickness stress which, averaged through the thickness of the glass sheet, corresponds to a tensile stress of less than 10 MPa.

The pane of this invention, when it is intended for an automobile vehicle, does not comply with the safety standards imposed for monolithic panes and, for this reason, must also comprise at least one sheet of plastics material, and it is then constituted of a laminated composite. A symmetrical laminated composite may be used, for example of the intermediate sheet type of glass/plastics/glass, the plastics intermediate layer being typically based upon polyvinyl butyral, or again an asymmetric laminated composite may be used, for example of the glass/plastics material type, the plastics material then being typically a polyurethane in the form of a film or sheet, which must be soft or at least flexible. More complex assemblies may, of course, also be used, which may possibly comprise more than two sheets of glass.

Preferably again, the tensile stress possessed by the intermediate region is from 3 to 7 MPa and is thus notably less than the tensile stress observed in the case of toughened panes. In other words, an impact that might occur in this intermediate region will be much less dangerous for the pane.

From the characteristics listed above, it also becomes apparent that the panes according to this invention have high edge stresses, which give them good strength during handling. Moreover, the level of the isotropic stresses results in a very characteristic fracture pattern, with the formation of splinters of large dimensions and fracture lines or cracks, from which a large number of branches reach to the edge of the pane.

The intermediate region, which remains the most brittle, although this brittleness is reduced by reason of the low values of the tensile stress, preferably does not extend beyond 20 mm from the edge of the glass sheet and, preferably again, not beyond 15 mm. It is for this reason especially narrow; it must also be emphasized that the marginal region is advantageously of a width of between one and three times the thickness of the glass sheet, so that the width of the intermediate region is generally not greater than 5–10 mm. In other words, the probability that the impact will occur in this brittle region is very much lower than with panes according to the state of the art, whether they be toughened or annealed.

The panes according to this invention are produced, for example, by a method of curving on a shaping bed composed, for example, of rollers or other revolving elements, in which the treatment of the glass sheets is completely individualized, including the cooling stage. Those methods are most suitable in which the cooling of the glass takes place while it is still carried by the supporting elements. Among these methods we would particularly mention the method of curving which consists in that the glass sheets, one after another, preheated to the curving temperatures travel along a curved longitudinal trajectory having basically the shape of a cone of revolution or, preferably, essentially of cylindrical shape, tangential to the plane trajectory through the heating furnace and passing between blowing chests for a cold gas, the glass sheets then tilting to follow a plane trajectory until their cooling is completed.

The method recalled above is known, notably, from the Patents or Patent Applications FR-B2-2 442 219, EP-B-133 14, EP-A-346 197, EP-A-346 98 and FR-A-2 650 820, where the glass sheets are toughened during their curved longitudinal trajectory and the contents of the descriptions of which should be considered as incorporated here. Within the framework of this invention, the cooling is certainly less intense (for a given thickness of glass considered) than in the case of a conventional toughening. But it must be emphasized that the panes according to this invention generally incorporate thinner glass sheets, which demand relatively higher blowing pressures. In practice it has been established that the cooling blowing pressures used for the production of a 3 mm thick pane having a fragmentation in accordance with the safety standards for toughened automobile glazing are suitable for the production of a pane having a state of stresses according to this invention and approximately 2.5 mm thick.

In this type of curving method, the sheets pass over a shaping bed, preferably composed of rollers, which supports the entire lower face of the sheet. Other rollers or other holding means may if desired act upon the upper face. The treatment undergone by the sheet is therefore very largely uniform, whereas during the methods that use a frame—whether a settling frame or a pressing frame—there is a greater differentiation between the treatment of the edges and the treatment of the central part. This has, as its first advantage, a greater control of the curvature obtained in the central part of the pane. For this reason this method is especially well adapted to the manufacture of panes mounted slidably, like the lateral panes of automobiles which must be able to pass through a relatively narrow slot, unless the designer chooses to use thick seals, which are not very aesthetic, and the effectiveness of which deteriorates as the years pass.

Unexpectedly, it has also been found that the reproducibility of this type of curving process is such that it enables two sheets of glass to be assembled into a composite pane, provided nevertheless that these sheets have been treated during a single period of production, the duration of which does not exceed, for example, 15 minutes for a throughput rate, for instance, of 1,000 bodies of glass per hour.

This possiblity of pairing or matching glass bodies is quite remarkable, since it must be emphasized that in all the known methods of curving glass sheets intended for a laminated pane, the last step always consists of an annealing, while the glass sheets intended to be assembled are placed one upon another in order to obtain perfect coincidence of the curvatures. For this reason, the treatment is not entirely individualized and from the start of the process the glass sheets are matched in pairs, and it follow that if any optical defect or curvature defect is found on one of the glass sheets, the pair must be rejected.

Another important difference from the known methods according to the art is that particularly high production rates can be used, while still preserving a very high optical quality.

Furthermore, as indicated earlier that the invention is aimed particularly at the production of lateral glazing panes or opening roofs, products intended for vehicles which, according to the choice of the purchaser, will be equipped with toughened panes, "simple" laminated panes or laminated panes with a certain level of toughening; in terms of products, the two types of panes therefore belong to the same family and the manufacturer has a great interest in using the same production line, so that a modification of the balance of the demand may be taken into account quickly and practically without problems. This advantageous aspect is again reinforced in the present case by the fact that, in order not to increase the weight of the panes—and their cost which is a direct function of their thickness when a toughened pane is substituted for a laminated pane—the aim is not excessively to increase the total thickness of the pane when this pane is composed of two glass sheets. Typically, a change is made from a toughened pane 3.2 mm thick to a laminate 2/0.76/2, the intermediate number corresponding to the thickness of the sheet of plastics material (PVB). Now in order to obtain a given level of stresses, a blowing pressure for the cold gas is required, which becomes higher the thinner the glass sheet, and it has been indicated earlier that the edge stress levels desired are obtained for a glass sheet of approximately 2 mm with blowing pressures in the vicinity of those used for the production of a pane of 3 mm thickness having a fragmentation in accordance with the safety standards for toughened glazing. For glass 2 mm thick, there is therefore virtually no supplementary adjustment to be carried out. Since, moreover, the general appearance of the automobile does not need to be modified and the curvatures desired are perfectly identical, the versatility of the production line is therefore total.

The blowing of cold air by nozzle chests onto moving glass sheets results in a particular structure of the stresses, which can be seen under special lighting conditions and notably in polarized light. Alternate stripes of more or less marked intensity of coloration then appear and continue virtually to the edge of the pane. In the same lighting conditions, a glass sheet which has undergone an annealing treatment gives an entirely white image over the entirety of the surface of the glass sheet, with the exception of the peripheral band reflecting the edge stresses.

Other details and advantageous characteristics of the invention will become apparent from the following description, prepared with reference to the attached drawings, which show:

DETAILED DESCRIPTION OF THE PREFERRED EMBODIMENTS

To characterize clearly the panes according to this invention, a series of measurements have been performed, which are intended for specifying the stress states obtained by different processes, and notably the stress levels in the different regions and the width of the peripheral regions surrounding the central region.

The surface compressive stresses were measured by means of an epibiascope, such as that described in the engineering article of the French Review by M. Claude GUILLEMENT and M. Paul ACLOQUE, entitled "Nouvelles méthode optiques de détermination des contraintes au voisinage de surfaces de milieux transparent" ("New optical methods for determining the stresses in the vicinity of the surfaces of transparent mediums")—1962—pages 157 to 63.

For determining the edge stresses, the difference between the principal stresses in the vicinity of the edge was measured by an optical method using a compensator known as the Babinet method. It being known that, for reasons of physics, the stress perpendicular to the edge is zero exactly at the edge and negligible near it, the tangential stress at the edge was derived.

TABLE I

|  | No. 1 | No. 2 | No. 3 | No. 4 | No. 5 | No. 6 |
| --- | --- | --- | --- | --- | --- | --- |
| Thickness of glass sheet | 3.15 mm | 3.15 mm | 2.58 mm | 2.58 mm | 2.58 mm | 2.05 mm |
| Edge stresses | 20–50 MPa | 50–60 MPa | 60–85 MPa | 20–25 MPa | 40 MPa | 60–80 MPa |
| Distance from edge to neutral line | 2.5–3 mm | 4–4.5 mm | 5.5–6.5 mm | 5–8 mm | 5–10 mm | 4.5–5.5 mm |
| Tensile stresses | 7–16 MPa | 5–7 MPa | 9–16 MPa | 4–6 MPa | 8–14 MPa | 4–6 MPa |
| Limit of tensile zone | 17–22 mm | 12–18 mm | 25–30 mm | 40–65 mm | 45–55 mm | 10–15 mm |
| Surface stresses | 133 MPa | 60–64 MPa | 120 MPa | 3–5 MPa | 3–5 MPa | 60–65 MPa |

It is defined that the neutral line is the location at which the mean value through the thickness of these edge stresses measured tangentially cancels out.

Figure 3:
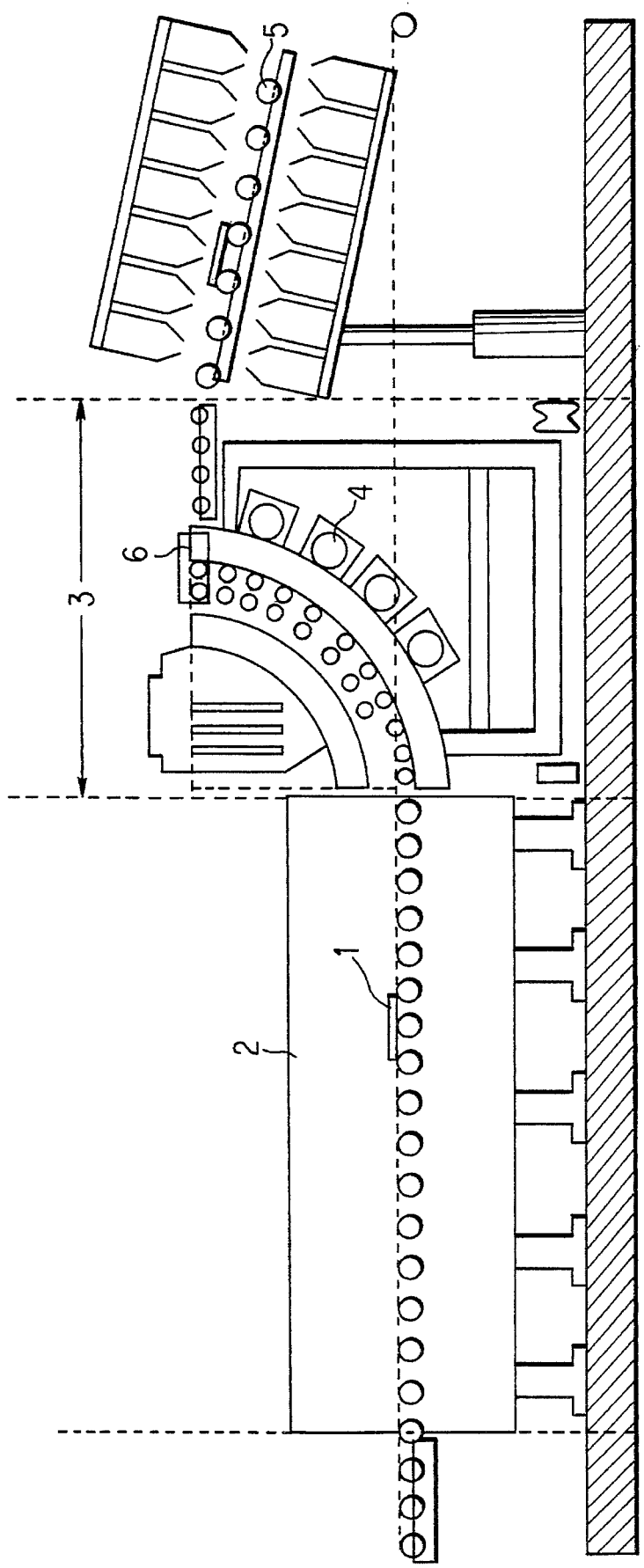
FIG. 3 shows a diagrammatic layout of a production line adapted for carrying out the process according to this invention.

Tests nos. 1, 2 and 6 were carried out on a production line on the technique known notably from Patent FR-B-2 242 219 and shown diagrammatically in FIG. 3. It should be noted that only the conveying elements have been shown, for improved clarity. According to this technique, the glass sheet first passes through a heating zone 2, where it is carried by a horizontal conveyor composed of a series of driving rollers. At the outlet from the heating zone 2, its temperature now being higher than or equal to its curving temperature, it enters the first part of the curving zone 3, in which the rollers are mounted according to a longitudinally cylindrical profile with radius $R_1$. The rollers thus form a shaping bed, preferably having its concavity upwards, and travelling forward on this bed (from left to right in FIG. 1); the glass sheets thus acquire a cylindrical curvature having a radius of curvature $R_1$, obtained under the combined action of gravity, upper elements if present and their speed.

The first part of the curving zone 3 is followed by a second part, which is also a cooling zone in which the rollers are also disposed along a circular profile of radius $R_1$. The cooling elements are constituted of blowing chests 4 equipped with fixed nozzles disposed on either side of the rollers and thus acting on both faces of the pane so that, by passing between the chests 4 and depending upon the blowing pressure chosen as a function of the thickness of the sheet, the curved glass sheet will be either toughened or simply hardened in the curved position. The cooled glass sheets are finally removed by a plane conveyor 5, which passe through a secondary cooling zone, a tilting device 6 being employed, if desired, to facilitate their discharge from the cooling zone 4.

Perpendicularly to the principal curvature of radius $R_1$ parallel to the straight edges, it is possible, if desired, to give the glass sheet a secondary curvature of radius $r_2$, $r_2$ being preferably greater than 20 meters, this limit being associated with technical considerations relating to the construction of shaped rollers. In this case, the rollers will preferably be equipped with counter-bending devices as indicated in Patent Application EP-A-413 619 and the shaping bed will also be completed by a second set of rollers acting on the upper face of the glass sheet and assisting in the advancing of the glass. These upper elements are also used when the shaping bed follows a true, non-cylindrical cone (FR-90. 10585 of 23 Aug. 1990) or is shaped in accordance with the teachings of Patent Application FR-A-90.16178 of 21 Dec. 1990.

Depending upon the thickness of the glass sheet and/or the degree of toughening desired, the cooling blowing pressure will be adjusted. For the production of panes according to this invention, it is preferable for the cooling by the toughening blowing chests to be carried out so that the temperature gradient, depending upon the thickness, shall be at most 50° C., the glass sheets when they tilt having a core temperature lower than the softening temperature of the glass. It should be noted that, even if this process comprises a treatment of the glass sheets which is completely individualized up to the point of complete cooling, the reproducibility of the curvature and the optical quality are such that they allow assembling by pairs of the curved glass sheets, provided always that sheets of glass treated in sufficiently identical conditions are chosen (in such a way as to avoid the excursions linked with modifications to the heating (change of furnace set-point or, quite simply, variation in the temperature in the production shop) and linked to the wear of components such as the roller). For a production line producing approximately 1,000 panes per hour, it will be possible to assemble, for example, glass bodies produced in the same quarter of an hour.

Test no. 3 was performed in an installation in accordance with the teachings of Patent EP-B-3391. The glass sheet i heated in a horizontal furnace, is sucked by an upper plane element perforated over its entire area with small orifices, and then allowed to fall onto a frame open at its center, the shape of which corresponds to the shape that it is desired to impart to the periphery of the glass sheet. After this curving by gravity and inertia, the curved glass sheet is immediately conveyed to a toughening station, still supported by the curving frame, which thus fulfils the function of a toughening frame. In this well known process, the rim of the glass sheet rests upon the frame while its central part is never in contact with the curving tools (with the exception of a short instant of application against the upper element).

Tests no. 4 and 5 were carried out on a conventional production line for curved glass for laminated panes. Two superimposed glass sheets are deposited cold on a frame open at its center. The frame is moved into a curving furnace, where the glass sheets deform under the effect of their own weight. When the curving is completed, the glass sheets are moved to an annealing station for slow, controlled cooling. In the case of test no. 5, this cooling is managed in such a manner as to create relatively high edge stresses, for example by operating as indicated in Patent Application EP-A-322 282.

Let us now return to the values indicated in Table 1. Whatever the process known from the state of the art used, the presence of edge stresses measured tangentially and therefore parallel to the edge and of relatively high value leads to a level of tensile stresses in the intermediate zone greater than 7 MPa, and capable of reaching 16 MPa. Furthermore, the width of the region in tension (limit of zone in tension less distance from edge to neutral line) is from 17 mm to 40–45 mm, the highest values being established for panes curved in pairs. With such widths of several centimeters, there is indisputably a brittleness zone liable to damage from chippings that is of serious concern.

In the case of this invention, in contrast (tests no. 2 and no. 6), the tensile stresses measured are less than 7 MPa and generally less than 5 MPa. Furthermore the width of this region in tension is from 5 to 10 mm and therefore covers a much smaller area than with the panes according to the state of the art.

The behaviour on breakage of a pane according to this invention is also remarkable.

The toughened panes according to tests no. 1 and no. 3 exhibit a breakage in conformity with the European regulation on toughened automobile panes or between 50 and 350 splinters for each square of 5 cm side, without any needle exceeding 7.5 cm, all the fragments having a size less than 3.5 cm$^2$, the count not being made within a radius of 7.5 cm around the point of impact nor within a strip of 2 cm width at the periphery of the pane.

Figure 2:
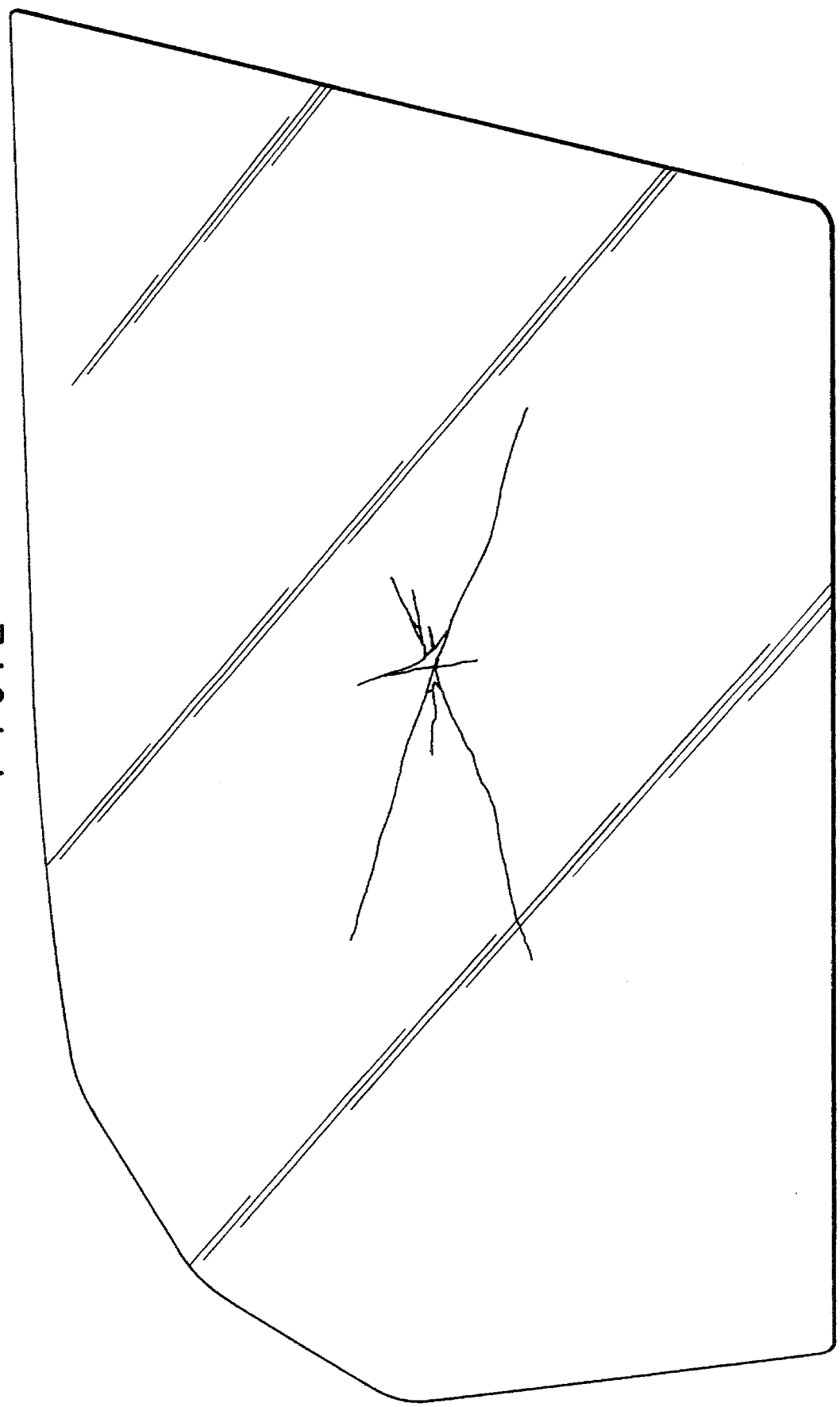
FIG. 2 shows a fracture image of a laminated pane which has undergone an annealing operation.

Panes no. 4 and no. 5 have a conventional breakage pattern for a laminated pane, illustrated in FIG. 2. With a stone chip or equivalent object, the formation of a star is caused, but not the formation of splinters (or in other pattern cases possibly the presence of only a few splinters around the point of impact). On the other hand, the fracture lines, in small numbers, do not propagate as far as the edge but extend at most over about 15 centimeters.

Figure 1:
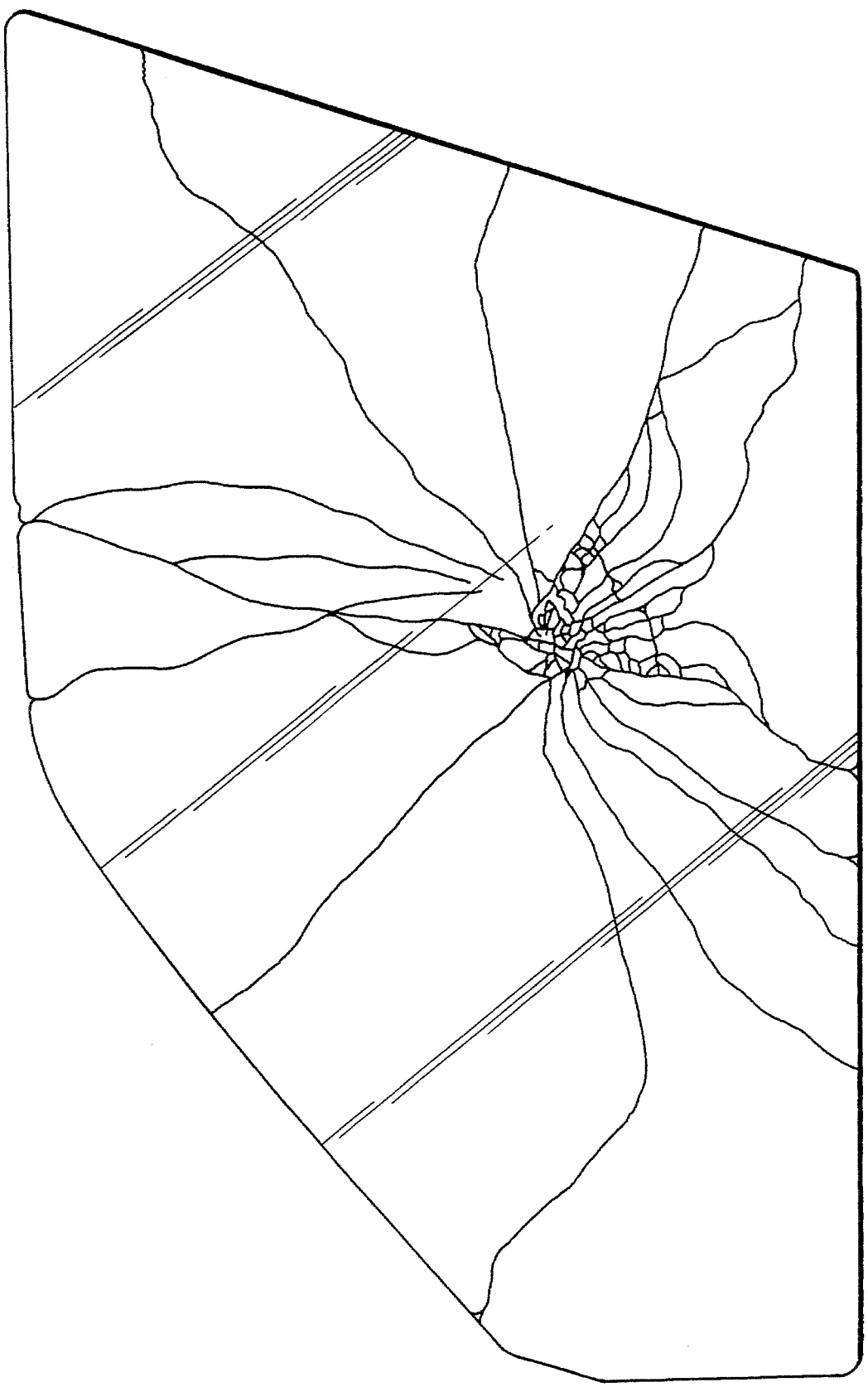
FIG. 1 shows a fracture image of a pane according to this invention.

In the case according to this invention, shown in FIG. 1, the number of fracture lines is much greater and the various branches reach to the edge of the pane, forming a whole series of splinters, but in contrast to what occurs in the case of an effectively toughened pane, these splinters are of large dimensions. Nevertheless, the absence of needles is noted and in particular the fact that these splinters remain glued by the sheet of plastics material of the PVB type and that the safety of the passengers thus remains assured—and even improved, because the pane still allows good visibility through it.

Moreover, the panes according to this invention can be recognized by their simple image under a polarized light, which causes the appearance of iridescence patches characteristic of the cooling. The panes according to this invention thus comprise alternate stripes of more or less marked color intensity, reaching to the edge of the pane. To a less pronounced extent, the image of a "conventional" toughened pane is thus found, such as that of test no. 1. The image of a "conventional" laminated pane is, in contrast, entirely white over the entire area of the glass except for a very slightly coloured peripheral band, reflecting edge stresses. This results in a strengthening of the entire area—and moreover with high edge stresses. This point is especially advantageous in the case of lateral panes, most commonly fixed on one side only (it must be possible to lower the window) and which are therefore subjected to very high loadings (when doors are slammed, for example).

Finally, a careful inspection of the panes according to this invention does not reveal "flats", nor points of inflection of the curvature in the vicinity of the edges, an indication of the absence of a frame on which the pane might rest during its shaping.

We claim:

1. Process for the production of a pane comprising at least one sheet of glass of a thickness of from 1.5 to 4 mm, the sheet having a central region in which the surface compressive stress is from 40 to 100 MPa, a marginal region having an edge stress of from 50 to 100 MPa and an intermediate region, disposed between the central region and the marginal region, having an anisotropic thickness stress which, averaged throughout the thickness of the glass sheet, corresponds to a tensile stress of less than 10 MPa, the process comprising the steps of:

successively reheating thermally hardened glass panes in a reheating furnace by moving the glass panes along a plane trajectory in the heating furnace;

successively moving the glass panes exiting the heating furnace along a curved longitudinal trajectory which is tangential to the plane trajectory;

successively passing the glass sheets between blowing chests which blow cold or tepid gas to the glass sheets, wherein the glass sheets follow a downwardly tilting trajectory while passing between the blowing chests; and dispatching the curved and cooled glass sheets to an assembly station in batches corresponding to a production period not exceeding 15 minutes.

2. Process according to claim 1, wherein said curved longitudinal trajectory is substantially a cone of revolution.

3. Process according to claim 1, wherein said curved longitudinal trajectory is substantially cylindrical.

4. Process according to 1, wherein said substantially curved longitudinal trajectory comprises a cylindrical trajectory.

5. Process according to claim 2, wherein said longitudinal trajectory having substantially the form of a cone of revolution comprises a true cone.

6. Process according to claim 1, wherein the glass sheets move parallel to their height.

7. Process according to claim 2, wherein said longitudinal trajectory having substantially the form of a cone of revolution comprises an ascending trajectory.

* * * * *